US005174690A

United States Patent [19]

Targett et al.

[11] Patent Number: 5,174,690

[45] Date of Patent: Dec. 29, 1992

[54] MOUNTING POWER TOOLS

[75] Inventors: Derrick R. Targett, Barnetby; Roger Bagshaw, Sheffield, both of Great Britain

[73] Assignee: Targett Power Equipment Services (Scunthorpe) Limited, South Humberside, United Kingdom

[21] Appl. No.: 773,555

[22] PCT Filed: May 3, 1990

[86] PCT No.: PCT/GB90/00682

§ 371 Date: Nov. 6, 1991

§ 102(e) Date: Nov. 6, 1991

[87] PCT Pub. No.: WO90/14199

PCT Pub. Date: Nov. 29, 1990

[30] Foreign Application Priority Data

May 11, 1989 [GB] United Kingdom ................ 8911027

[51] Int. Cl.[5] .......................................... B23B 45/14

[52] U.S. Cl. .................................. 408/1 R; 408/76

[58] Field of Search .................. 408/1 R, 56, 76, 702; 294/65.5; 335/295

[56] References Cited

U.S. PATENT DOCUMENTS

| | | | |
|---|---|---|---|
| 2,820,377 | 1/1958 | Buck | 408/76 |
| 3,969,036 | 7/1976 | Hougen | 408/76 |
| 4,664,565 | 5/1987 | Palm | 408/76 |

FOREIGN PATENT DOCUMENTS

| | | | |
|---|---|---|---|
| 124504 | 7/1984 | Japan | 408/76 |
| 166403 | 9/1984 | Japan | 408/76 |
| 811458 | 4/1959 | United Kingdom | 408/76 |
| 874095 | 8/1961 | United Kingdom | 408/76 |
| 2085767 | 5/1982 | United Kingdom | 408/76 |

*Primary Examiner*—Daniel W. Howell

[57] ABSTRACT

A mobile power tool operating assembly for performing material treatment operations, such as drilling, has permanent magnet means to mount the power tool on a ferromagnetic workpiece, and release means to permit release of the magnet means for repositioning of the tool. The release means comprises a screw threaded jack which tilts the assembly so as to overcome the magnetic attraction. The tool can then be repositioned and lowered to its normal working attitude.

16 Claims, 2 Drawing Sheets

MOUNTING POWER TOOLS

This invention relates to power tools. More particularly, the invention relates to a mobile power tool mounting assembly and a method of using same.

In the case of mobile power tools, such as drills, there is a requirement for some simple means to enable the tool to be mounted and held at a selected location for performing a material treatment operation, such as drilling, while then being able to release the tool so that it can be moved to another location on the workpiece for a subsequent operation.

An electro-magnetic system for mounting the power tool on a ferro-magnetic workpiece solves the problem of secure clamping to the workpiece and subsequent release. However, such an arrangement has attendant shortcomings including the fact that an electro-magnetic system cannot be used in fire-hazardous locations (due to the inevitable spark danger), and such systems carry with them other dangers including the possibility of the power tool falling from a non-horizontal workpiece and injuring a worker, if the power supply to the electro-magnet is accidentally interrupted.

A proposal has been made for the provision of a permanent magnet system for holding power tools to a work piece. According to this prior proposal a large and heavy permanent magnet is loosely mounted within a box or casing of ferro-magnetic material, which is closed at the base by alternate strips of steel and brass. A lever mechanism mounted on the top of the box is connected to the magnet within by a lift link. The lever can be lowered to raise the magnet within the box, and vice versa. There is provided, on the top surface of the box, a mounting plate for a power tool.

Numerous shortcomings of this prior proposal include the following. Firstly, the use of a box for containing the magnet is adopted in order to be able to apply the necessary lifting force to the magnet for disengagement of it from the workpiece. However, there is a direct technical penalty arising from this arrangement for actuating the magnet, namely that the magnetic attraction force acting between the magnet and the workpiece is greatly reduced. As a result, the technical specification of the equipment is necessarily limited to ensure that the power tool does not apply more torque than the magnetic attraction will resist. Also, a large magnet is required in order for the unit to be practical at all, and this increases the overall size of the boxed magnetic unit and therefore limits its utility in relation to working on certain smaller workpieces such as relatively narrow girders.

A further factor in relation to this prior proposal concerns the lever actuation mechanism. This mechanism is simple to actuate, but operates in an on/off manner. As a result, there is no intermediate "partially on/-partially off"condition in which sufficient attraction between the magnetic workpiece is maintained to permit position-adjustment of the magnet and tool while retaining same on the workpiece. While this is not a problem when working on horizontal surfaces, it is of great practical significance and has safety implications when working on vertical surfaces and on horizontal surfaces which face downwardly.

An object of the present invention is to provide a mobile power tool mounting assembly, and a method of using same, offering improvements in relation to matters discussed herein, or generally.

According to the invention there is provided a mobile power tool mounting assembly, and a method of using same, as defined in the accompanying claims.

There is disclosed in U.S. Pat. No. 3,014,751 (Smith) a magnetic device for the handling of sheet material and the like that is responsive to magnetic attraction, such as sheet iron, steel, or the like. It is mentioned in the specification that the invention may provide a permanent magnet device which may be attached to a part of a wood working machine, such as the steel or iron bed of a power saw, for properly positioning the piece of material being worked on. There is provided, as part of the magnetic device, lever means pivotally mounted at one side of the assembly, including a cam adapted to be moved by a handle. In use, the cam forces the magnets away from the sheet of material being held.

This prior arrangement, while including thrust means to overcome the magnetic effect, in no way assists with the problem of re-positioning a mobile power tool, such as a power drill, for successive drilling operations at precisely defined positions. The teaching of this prior patent concerns itself with the positioning and mounting of a work piece rather than with the power tool itself.

In a preferred embodiment, a mobile power tool mounting assembly, for performing material treatment operations such as drilling at selected locations on a workpiece comprises a support structure, mounting means for mounting a power tool on the support structure, and actuating means for the power tool to advance and retract same with respect to the support structure, to effect such material treatment operations. Permanent magnet means is mounted on the support structure for holding that structure and the tool at a selected location to the workpiece or to an associated ferro-magnetic mounting plate or the like. Release means is provided to permit release of the support structure from the workpiece or mounting plate, to permit re-positioning of the tool.

The release means comprises thrust means arranged to act between the workpiece or mounting plate and the support structure. The thrust means acts at a location offset from the central region of the permanent magnet means and is actuable to exert a thrust sufficient to overcome the attraction exerted by the permanent magnet means. In this way, the permanent magnet means is tilted relative to the workpiece.

Fulcrum means for the permanent magnet means is provided, about which it can tilt, the fulcrum means being constituted by an edge or side region of a lower surface of the magnet means. The thrust means applies its thrust at one location on the periphery of the magnetic holding means, whereby the latter tilts about another location on its periphery. Said one location is on the opposite side of the magnetic holding means from the power tool, whereby a tool element of the latter can be conveniently positioned relative to the workpiece while the magnetic holding means is tilted upwardly therefrom.

In the preferred embodiment, the thrust means comprises screw threaded means and an associated lever actuating means therefore. The screw threaded means has from 1 to 3 turns per inch. It may have a multi-start thread. Alternatively, lever or cam means may be provided as the thrust means. In any case, the thrust means is mounted on a bracket at one side of the permanent magnet means, with the power tool at the other side thereof.

In the preferred embodiment, a mobile power tool operating assembly employs an air-powered drill for use in fire hazard areas where conventional electro-magnetic drill units are banned. A permanent magnet base provides magnetic attraction equivalent to electro-magnets while only having the same size and weight as an electro-magnet. The permanent magnets have an extremely long life and cannot be shorted out.

In the embodiment, a jacking-off system constitutes the thrust means to break the magnetic pull. This is constructed so that very little movement of a jacking lever is needed to lift the magnet at one end for re-positioning.

In the preferred embodiment, the use of permanent magnets is very beneficial when using the power tool either upside down or on other non-horizontal surfaces. No accidental loss of power to the magnet can occur and danger from injury by a falling power tool is correspondingly reduced. Moreover, the tool is very portable and weighs less than conventional electro-magnetic assemblies, while having the ability to perform operations with the same capacity. The air-powered tool is very cheap to run and meets health and safety requirements.

An embodiment of the invention will now be described by way of example with reference to the accompanying drawings in which.

Figure 2:
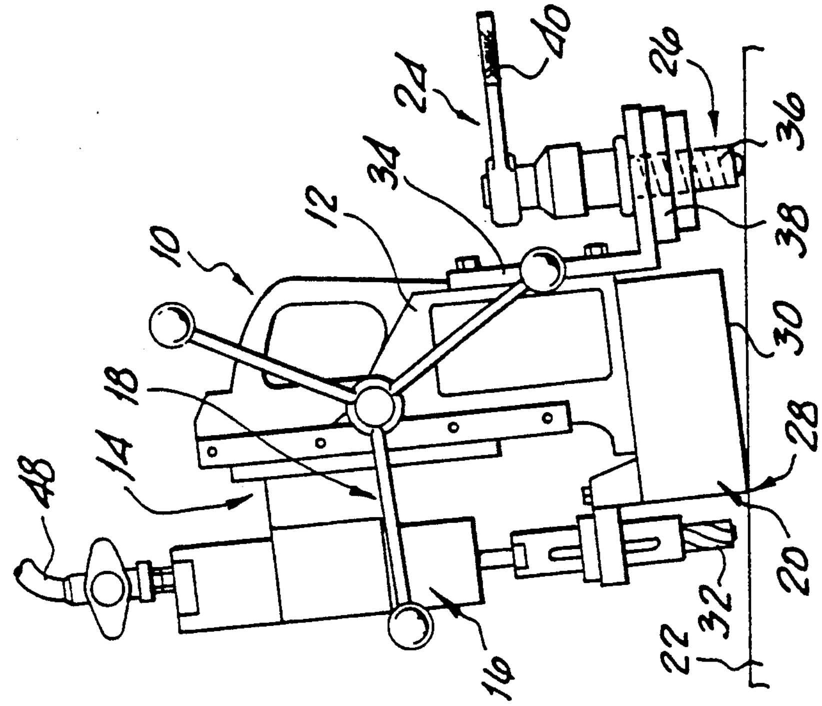
FIG. 2 shows the assembly of FIG. 1 with the power tool and magnetic holding means tilted for re-positioning.

As shown in the drawings, a mobile power tool operating assembly 10 comprises a support structure 12 and mounting means 14 for mounting a power tool 16 thereon. Actuating means 18 is provided for actuating the power tool so as to advance and retract same with respect to the support structure to effect material treatment operations, such as drilling.

Permanent magnet means 20 is mounted on the support structure 12 for holding that structure and the tool 16 at a selected location on a workpiece 22, or on an associated ferro-magnetic mounting plate or the like.

Release means 24 is provided to permit release of the permanent magnet from the workpiece or mounting plate, to permit re-positioning of the tool 16.

The release means 24 comprises thrust means 26 arranged to act between the workpiece 22 and the support structure 12 at a location offset from the central region of the permanent magnet means 20, so as to tilt the magnet means relative to the workpiece, to the position shown in FIG. 2 for re-positioning the power tool.

As shown in FIG. 2, the magnet means 20 tilts about a fulcrum provided by an edge or side region 28 of the lower surface 30 of the permanent magnet means 20. Thrust means 24 applies its thrust at the opposite side of magnet means 20 from the power tool 16, whereby a tool element 32 thereof can be conveniently positioned relative to workpiece 22 while magnet means 20 is raised therefrom, as shown in FIG. 2.

Thrust means 24 is mounted on a bracket 34 at one side of magnet means 20. A rotatable jacking member 36 screw-threadedly engages a complementary threaded member 38 mounted on bracket 34. The screw thread is of relatively coarse pitch, namely one turn per inch (one TPI) whereby half a turn on a manual operating lever 40 mounted on jacking member 36 raises the assembly half an inch, which is usually sufficient to effectively break the magnetic hold and permit the assembly to be manually re-positioned on workpiece 22.

Figure 1:
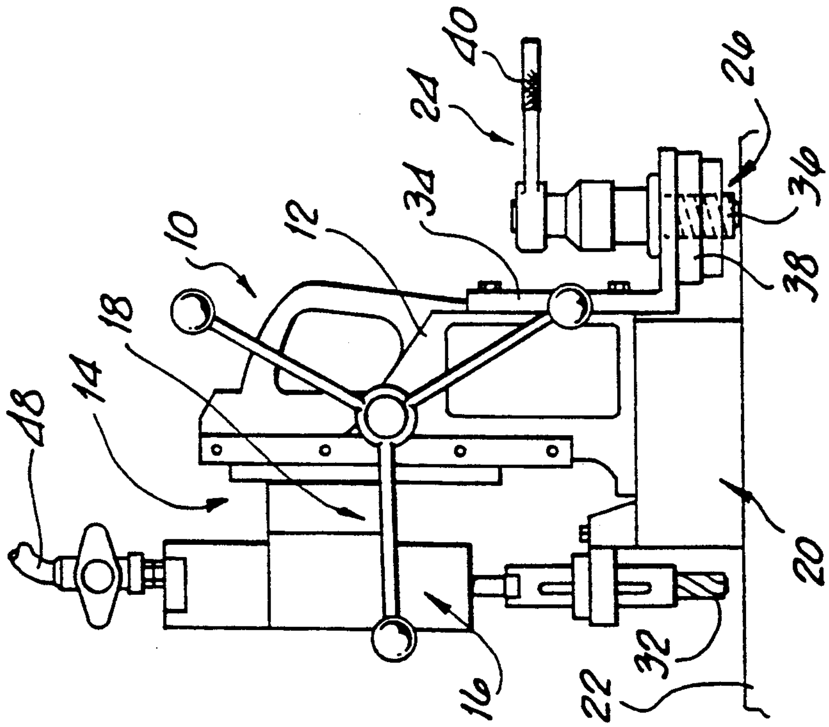
FIG. 1 shows a side elevation view of a mobile power tool operating assembly in its normal working position.

Re-positioning is relatively simple. By means of a pilot hole or punched dimple provided in the workpiece, engageable by a central needle or guide on drill element 32, the latter can be readily exactly positioned relative to the desired hole location, whereupon thrust means 24 is actuated in a lowering direction to enable the assembly to be returned to its FIG. 1 normal operating attitude at the desired location. Then, the actuating means 18 for the power tool is operated to advance same to commence drilling the hole.

Figure 3:
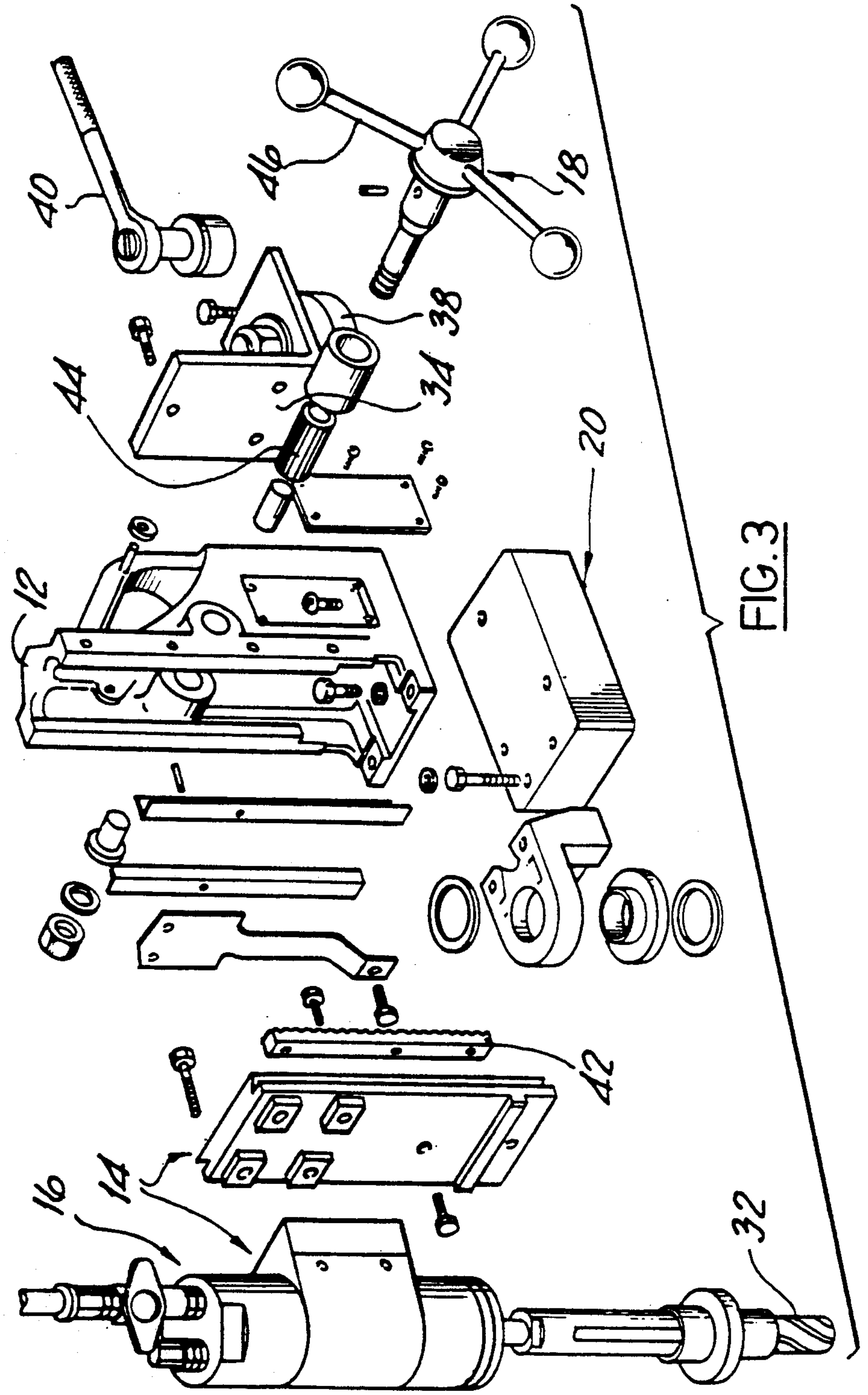
FIG. 3 shows an exploded perspective view of the assembly.

FIG. 3 shows further details of the assembly 10 including a rack 42 and pinion 44 arrangement operated by hand lever 46 and constituting the actuating means 18.

Power tool 16 is powered by an air line 48, and operation of the assembly 10 will already be apparent from the foregoing description. In fire hazard areas the use of a cooling fluid at the cutting zone further minimizes the fire risk.

Interestingly, the above embodiment provides a simple means whereby the advantages of a permanent magnet mounting system are realized without the space and cost and convenience penalties of previous proposals, thereby enabling the provision of an efficient power tool assembly for use in fire hazard areas where hitherto no satisfactory compromise between the conflicting requirements discussed above has been achieved.

What is claimed is:

1. A mobile power tool mounting assembly, for mounting a power tool to perform material treatment operations, for example drilling, at selected locations on a workpiece, the mounting assembly comprising:

a) a support structure;

b) mounting means for mounting a power tool on said support structure;

c) permanent magnet means mounted on said support structure for holding said structure and said tool at a selected location on said workpiece or to an associated ferro-magnetic plate or the like; and d) release means to permit release of said magnetic means from said workpiece or mounting plate to permit repositioning of said tool relative thereto;

characterized in that e) said release means comprises thrust means arranged to act between said workpiece or mounting plate and said support structure at a location offset from the central region of said magnet means and actuable to exert a thrust sufficient to overcome the attraction exerted by said magnet means so as to tilt said magnetic means relative to said workpiece.

2. A mobile power tool mounting assembly having permanent magnet means for mounting a power tool on a workpiece, and release means therefore, said release means comprising thrust means to tilt the magnetic means relative to the workpiece, characterized in that said release means comprising thrust means arranged to act between said workpiece or a mounting plate and a support structure for the power tool, at a location offset from the central region of said magnet means.

3. An assembly according to claim 1 characterized in that said magnetic means tilts about a fulcrum provided by an edge or side region of a lower surface of said magnet means.

4. An assembly according to claim 1 characterized in that said thrust means is connected to said support structure at one location on the periphery of said magnet means whereby the same tilts about another location on said periphery.

5. An assembly according to claim 4 characterized in that said one location is on the opposite side of said magnetic means from said power tool whereby a tool element thereof can be positioned relative to said workpiece while the magnetic holding means is raised therefrom.

6. An assembly according to claim 2 characterized in that said thrust means comprises screw threaded means and an associated lever actuation means therefore.

7. An assembly according to claim 6 characterized by said screw threaded means having from 1 to 3 turns per inch.

8. An assembly according to claim 7 characterized in that said screw threaded means has a multi-start thread.

9. An assembly according to claim 2 characterized by said thrust means comprising lever or cam means.

10. An assembly according to claim 1 characterized in that said thrust means is mounted on a bracket at one side of said permanent magnet means.

11. An operating assembly according to claim 10 characterized in that said support structure is at the other side thereof.

12. A method of mounting a power tool for performing material treatment operations at selected locations on a workpiece, the method comprising the steps of providing a mobile power tool mounting assembly having permanent magnet means for mounting a power tool on a workpiece, and release means therefore, said release means further including thrust means to tilt the magnetic means relative to the workpiece, wherein said thrust means is arranged to act between the workpiece or a mounting plate and a support structure for the power tool at a location offset from the central region of said magnet means, and the step of causing said thrust means to act between said workpiece and said assembly so as to exert a thrust sufficient to overcome the attraction exerted by said permanent magnet means so as to tilt said assembly relative to said workpiece and enable said assembly to be re-positioned.

13. A method according to claim 13 characterized by the step of causing said thrust means to permit said power tool to return to its non-tilted operating attitude.

14. A method according to claim 13 characterized in that said method is performed in a combustible atmosphere, said power tool being air powered, and the method including the step of driving said tool by said air power.

15. A method according to claim 14 characterized in that said material treatment operation comprises a metal cutting step by means of said power tool, the method including the step of providing liquid cooling of the cutting element of said power tool.

16. A method according to claim 15 wherein the step of metal cutting comprises drilling.

* * * * *